US012117329B1

(12) United States Patent
Anderson et al.

(10) Patent No.: US 12,117,329 B1
(45) Date of Patent: Oct. 15, 2024

(54) CONTAINER MONITORING SYSTEM AND METHOD THEREOF

(71) Applicant: BARREL PROOF TECHNOLOGIES LLC, Murfreesboro, TN (US)

(72) Inventors: Brian Richard Anderson, Murfreesboro, TN (US); Keith Robert Smith, South Hadley, MA (US)

(73) Assignee: BARREL PROOF TECHNOLOGIES LLC, Murfreesboro, TN (US)

( * ) Notice: Subject to any disclaimer, the term of this patent is extended or adjusted under 35 U.S.C. 154(b) by 0 days.

(21) Appl. No.: 18/424,758

(22) Filed: Jan. 27, 2024

(51) Int. Cl.
*G01F 23/284* (2006.01)

(52) U.S. Cl.
CPC .................................. *G01F 23/284* (2013.01)

(58) Field of Classification Search
CPC ....................................................... G01F 23/284
See application file for complete search history.

(56) References Cited

U.S. PATENT DOCUMENTS

| | | | | |
|---|---|---|---|---|
| 1,854,122 | A * | 4/1932 | Eaton | G01S 7/4026 342/126 |
| 3,953,856 | A * | 4/1976 | Hammack | G01S 3/46 342/126 |
| 6,002,357 | A * | 12/1999 | Redfern | G01S 13/88 342/126 |
| 6,995,706 | B2 * | 2/2006 | Ohlsson | G01S 13/24 342/134 |
| 7,304,601 | B1 * | 12/2007 | Edvardsson | G01S 13/10 342/123 |
| 7,525,476 | B1 * | 4/2009 | Delin | G01S 7/4056 73/304 R |
| 7,821,444 | B2 * | 10/2010 | Hall | G01S 13/88 342/124 |
| 8,884,632 | B2 * | 11/2014 | Klofer | G01F 23/284 324/637 |
| 9,217,660 | B2 * | 12/2015 | Zlotnick | G01S 13/003 |
| 9,377,340 | B2 * | 6/2016 | Hägg | H04Q 9/00 |
| 9,518,859 | B2 * | 12/2016 | Bartov | G01F 23/2962 |
| 10,260,929 | B2 * | 4/2019 | Kassubek | G01S 13/878 |
| 10,788,351 | B2 * | 9/2020 | Welle | G01S 7/032 |
| 10,801,873 | B2 * | 10/2020 | Westerling | G01F 23/284 |
| 2005/0179584 | A1 * | 8/2005 | Ohlsson | G01S 7/023 342/159 |
| 2006/0201246 | A1 * | 9/2006 | Rolfes | G01B 15/04 73/290 V |
| 2007/0028684 | A1 * | 2/2007 | Benz | G01F 23/284 73/314 |

(Continued)

*Primary Examiner* — Peter M Bythrow
(74) *Attorney, Agent, or Firm* — HOLLOWELL PATENT GROUP; Kelly J. Hollowell

(57) ABSTRACT

The presented invention is a system, which may be attached to a face of a container, such as a barrel or a tank, that includes at least one antenna and an electronic system that causes the transmission of one or more signals in at least one frequency range, where the transmitted signals that are reflected off the fluid or liquid contained within the container are collected and evaluated by a method that determines a level of the fluid or liquid within the container based on the received reflections. The system and method further achieves technical advantages over the prior art as the invention disclosed remains external to the enclosed system (barrel, etc.) and does not affect the internal ecosystem or contents of the barrel.

19 Claims, 13 Drawing Sheets

(56) References Cited

U.S. PATENT DOCUMENTS

| | | | | |
|---|---|---|---|---|
| 2008/0272968 A1* | 11/2008 | Muller | .................. | G01F 23/284 |
| | | | | 343/703 |
| 2009/0007627 A1* | 1/2009 | Perl | .................... | G01F 23/2962 |
| | | | | 73/1.73 |
| 2010/0090883 A1* | 4/2010 | Chen | .................... | G01F 23/284 |
| | | | | 342/124 |
| 2010/0101317 A1* | 4/2010 | Ashrafzadeh | ........... | G01F 23/26 |
| | | | | 702/188 |
| 2011/0193567 A1* | 8/2011 | Klofer | .................... | G01F 23/284 |
| | | | | 324/642 |
| 2011/0272866 A1* | 11/2011 | Shameli | ................. | B22D 2/003 |
| | | | | 266/78 |
| 2012/0281096 A1* | 11/2012 | Gellaboina | ............. | G01S 15/88 |
| | | | | 342/179 |
| 2014/0208845 A1* | 7/2014 | Zlotnick | ................. | G01S 3/808 |
| | | | | 73/290 V |
| 2015/0007655 A1* | 1/2015 | Skowaisa | ................ | G01F 1/663 |
| | | | | 73/198 |
| 2015/0009063 A1* | 1/2015 | Korsbo | ................... | G01F 25/20 |
| | | | | 342/124 |
| 2015/0198474 A1 | 7/2015 | Howard | | |
| 2017/0141453 A1* | 5/2017 | Waelde | .................... | G01S 13/88 |
| 2019/0316951 A1* | 10/2019 | McCormick | ........ | G01F 23/2845 |
| 2022/0252444 A1* | 8/2022 | Kincaid | ................... | G01F 23/68 |

* cited by examiner

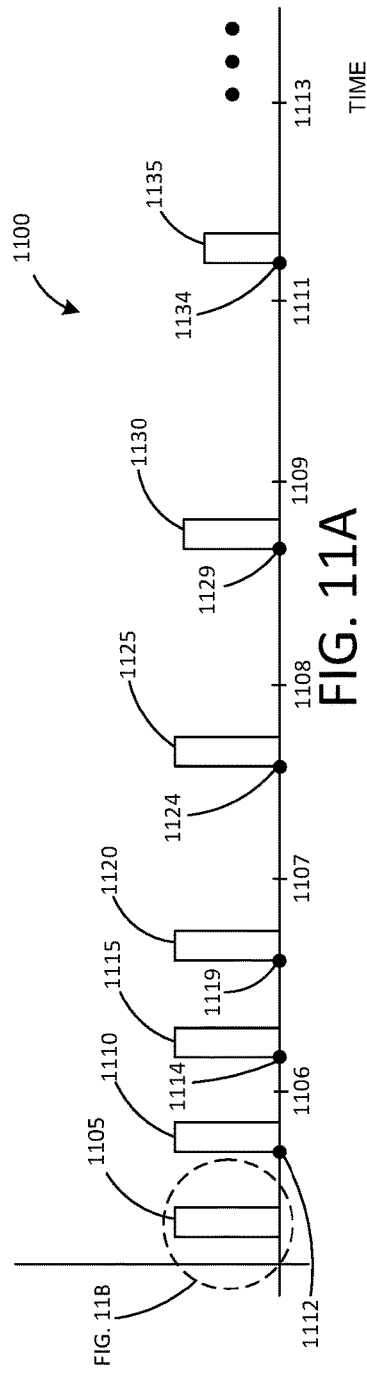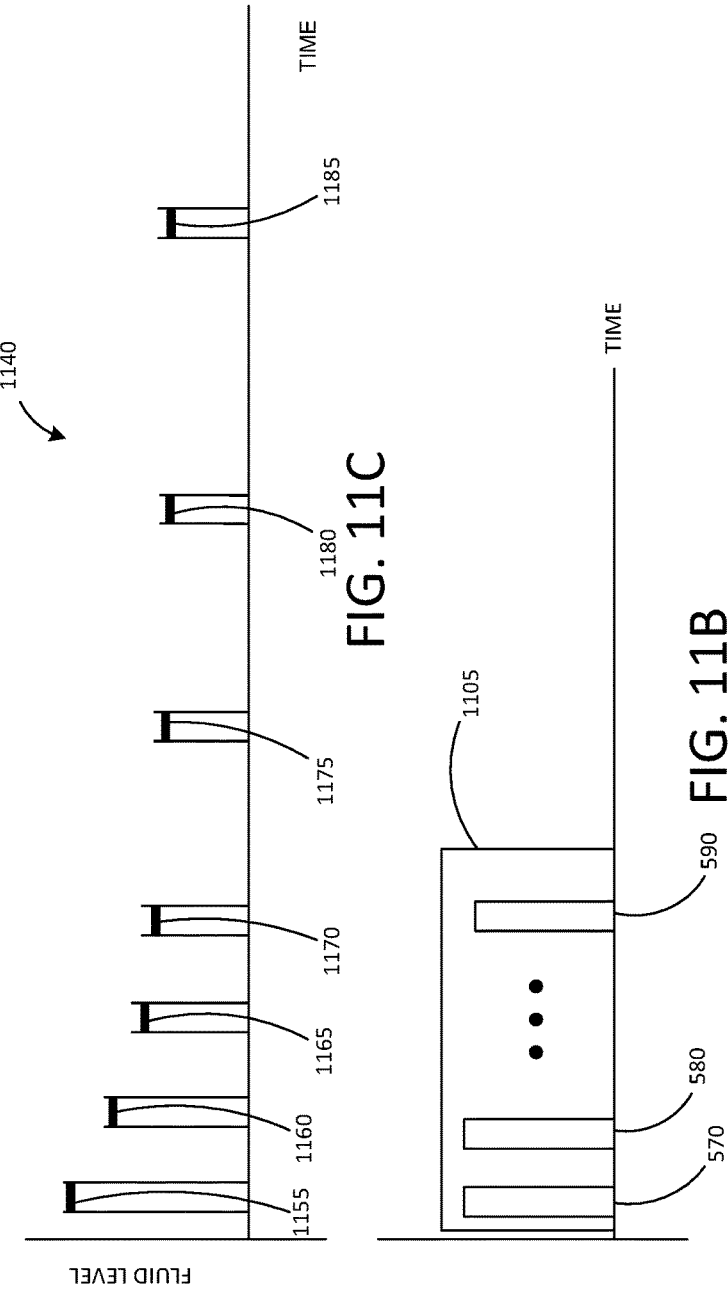

CONTAINER MONITORING SYSTEM AND METHOD THEREOF

FIELD OF THE INVENTION

This invention is related to the field of fluid management and, in particular, the field of measurement liquid content within containers.

BACKGROUND

Containers, such as barrels, have been used for centuries for the containment and processing of fermenting liquids. Whether the enclosed liquid is wine, beer or spirits, the wooden containers (or barrels) represent an industrial standard for the aging and fermentation of the contained liquid. In many cases, the fermenting liquid may be retained within the same wooden barrel for many years, wherein the increase in length of time (i.e., in storage) impairs different favor, quality and cost to the contained liquid. For example, spirits are measured by the duration of their aging process, wherein the longer the contained product is aged, the more expensive the value of the product becomes. For example, a 200-year-old Napoleon brandy is significantly more expensive than a 2-year-old brandy by the same manufacturer, as the brandy has been fermenting in the barrel for a significantly longer period of time.

However, issues regarding the use of wooden barrels are well-known in the art. For example, fermenting liquid within a barrel is prone to two types of losses. The first being evaporation of the liquid within the barrel and the second being absorption by the wooden elements comprising the barrels.

In many cases, the barrels, once filled, are retained within a known position, whether vertical or horizontal, for the duration of their intended aging process. During this time, inspection of the contained liquid (quality and level) may occur by the insertion of one or more types of measurement tools into the barrel.

However, insertion of the measurement tool may introduce air or other contaminants that may alter the quality of the contained liquid.

Hence, there is a need in the industry for a non-intrusive method and system for obtaining measurements of at least the level of the liquid contained within a barrel in order to determine at least one of the evaporation and absorption of the liquid within the barrel.

SUMMARY OF THE INVENTION

Disclosed herein are an apparatus and associated method implementations related to determining a liquid level within a barrel based on a system, located external to the barrel, configured to transmit a signal into the barrel and processing signals, reflected by the contained liquid, wherein the characteristics of the reflected signal (e.g. distance and time traveled) may be used to determine the presence of the liquid; determining a level of fluid within the barrel as a function of at least one of the distance and time traveled by the transmitted/reflected signal, determining a fluid level within the barrel and determining, as a function of at least the determined level of the fluid within the barrel and the physical dimensions of the barrel, the volume of fluid within the barrel.

In one aspect of the invention, the system disclosed may comprise a modular device consisting of a motherboard, a specialized breakout board (chips), a data transmission module, a power source and at least one transmit and/or receiving antenna. The system may be attached to the face of an enclosed container (e.g., a whiskey barrel, wine barrel, beer barrel) with an antenna array that is suitable for transmitting signals in at least one of a Millimeter Wave (MM Wave) range, or a radio frequency range (i.e., Institute of Electronic and Electrical Engineers (IEEE) designated bands HF through W, and other wavelength ranges). In one aspect of the invention, the system and method disclosed any utilize a millimeter wave transmission system in a wavelength band of 57-64 GHz. In another aspect of the invention, a transmission system may operate in one or more of an ISM (Industrial, scientific, and medical) wavelength band that would avoid interference with other types of electronic equipment.

In one aspect of the invention, each of the at least one antenna may be configured to emit or transmit a signal at a same known wavelength within one or more of the referred to wavelength bands. In one aspect of the invention, each of the at least one antenna may be configured to transmit a signal at a different known frequency (or wavelength) within one or more of the referred to wavelength bands.

In one aspect of the invention, the signal strength of the signals reflected by the contained fluid or liquid, may be used to determine the level of the contained fluid based at least on a position of one or more of the antennas receiving the reflected signals.

In one aspect of the invention, measurements regarding the signal strength and determined fluid level (and volume) may be relayed to a communications hub via one or more transmissions protocols and exported wirelessly (cellular, Wi-Fi) or over a wired Internet connection to a common database wherein reports may be derived. In another aspect of the invention, measurements regarding signal strength and determined fluid level (and/or volume) may be relayed by a near-field communication transmission (e.g., RFID, BLUETOOTH, etc.) that enable periodic monitoring of the determined fluid level and/or volume.

In one aspect of the invention, consultative data analysis reports may be created to assist a manufacturer/consumer with making actionable business decisions based upon results.

In accordance with the principles of the invention, the system and method disclosed may utilize a Millimeter wave transmission system (30 GHz-300 GHz) and an appropriately scaled (frequency selective) antennas to determine a level of the liquid inside of an enclosed container (e.g., a whiskey barrel).

In one aspect of the invention, by measuring the liquid level over time, a manufacturer/consumer may determine fluid internal volume at any given period.

In accordance with the principles of the invention, while barrel technology is referred to, it would be understood by those skilled in the art that the system and method disclosed may be utilized to determine the fluid level in any enclosed system used containing liquid.

Each of the foregoing implementations can be employed individually or in conjunction.

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings.

FIGS. 11A-11C illustrate exemplary signal transmission and signal return graphs as a function of time in accordance with one aspect of the invention.

Figure 1:
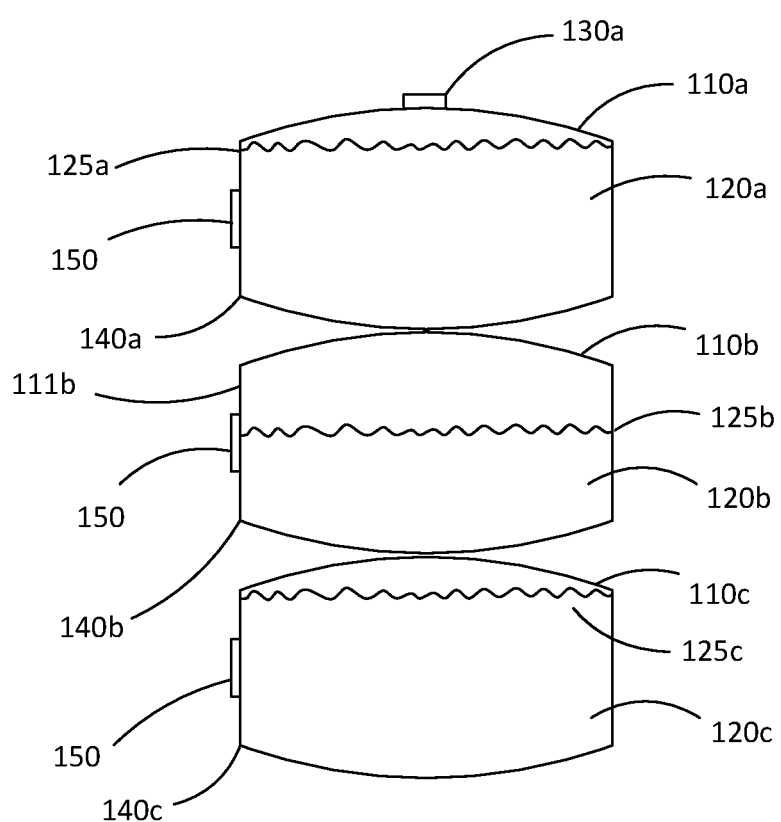
FIG. 1 illustrates a first conventional configuration for storing a plurality of barrels and the liquid contained therein.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

Note that the specific embodiments given in the drawings and following description do not limit the disclosure. On the contrary, they provide the foundation for one of ordinary skill to discern the alternative forms, equivalents, and modifications that are contemplated by the inventors and encompassed in the claim scope.

Numerous alternative forms, equivalents, and modifications will become apparent to those skilled in the art once the above disclosure is fully appreciated. It is intended that the claims be interpreted to embrace all such alternative forms, equivalents, and modifications where applicable.

FIG. 1 illustrates a first conventional configuration for storing a plurality of barrels and the liquid contained therein.

Conventionally barrels 110a, 110b, 110c, may be filled with a liquid 120a, 120b, 120c, respectively, and stacked horizontally in racks (not shown). The implementation depicted by FIG. 1 shows the exemplary respective liquid levels 125a, 125b, 125c of liquids 120a, 120b, 120c. Access to barrels 110a, 110b, 110c, is conventional though a bung 130 individually configured in each barrel 110 (of which only bung 130a associated with barrel 110a is shown). In the depicted example the bung 130a is positioned on a side surface of the corresponding barrel 110a. Although only bung 130a associated with barrel 110a is shown, it would be recognized that bung 130 (130a, 130b, 130c) is associated with each of the illustrated barrels 110a, 110b, 110c.

Generally, the bung 130 (e.g., 130a, 130b, 130c) enables a tester (not shown) to access the liquid 120a, 120b, 120c in a corresponding one of barrels 110a, 110b, 110c. As previously discussed, the conventional manner of testing is to insert an object (e.g., a pipette,) into the bung hole 130, wherein liquid is collected in the pipette and removed from the barrel 110. The liquid may then be tested to determine quality and the level of the liquid within the barrel using a graduated scale on the pipette.

However, as discussed above, the opening of the bung 130 to insert the pipette into the container 110 to test the contained liquid 120 introduces air and, possibly, other contaminants into the contained liquid. The introduced air may alter the quality of the contained liquid.

Accordingly, container monitoring system 150, disclosed, herein, resolves the issues that are known to occur with the conventional means for testing the liquid level within the container. Container monitoring system 150 provides a non-invasive method for determining a level of a contained liquid 120a within barrel 110a, through its inclusion or introduction onto a face surface 140 of each of the illustrated containers or barrels 110a.

Although face surface 140a associated with barrel 110a is shown, it would be recognized that monitoring system 150 may be applied to the face surface 140 of barrels 110b, 110c to provide a non-invasive method for determining a level of a contained liquid (120b, 120c) within barrels 110b, 110c, respectively.

Figure 2:
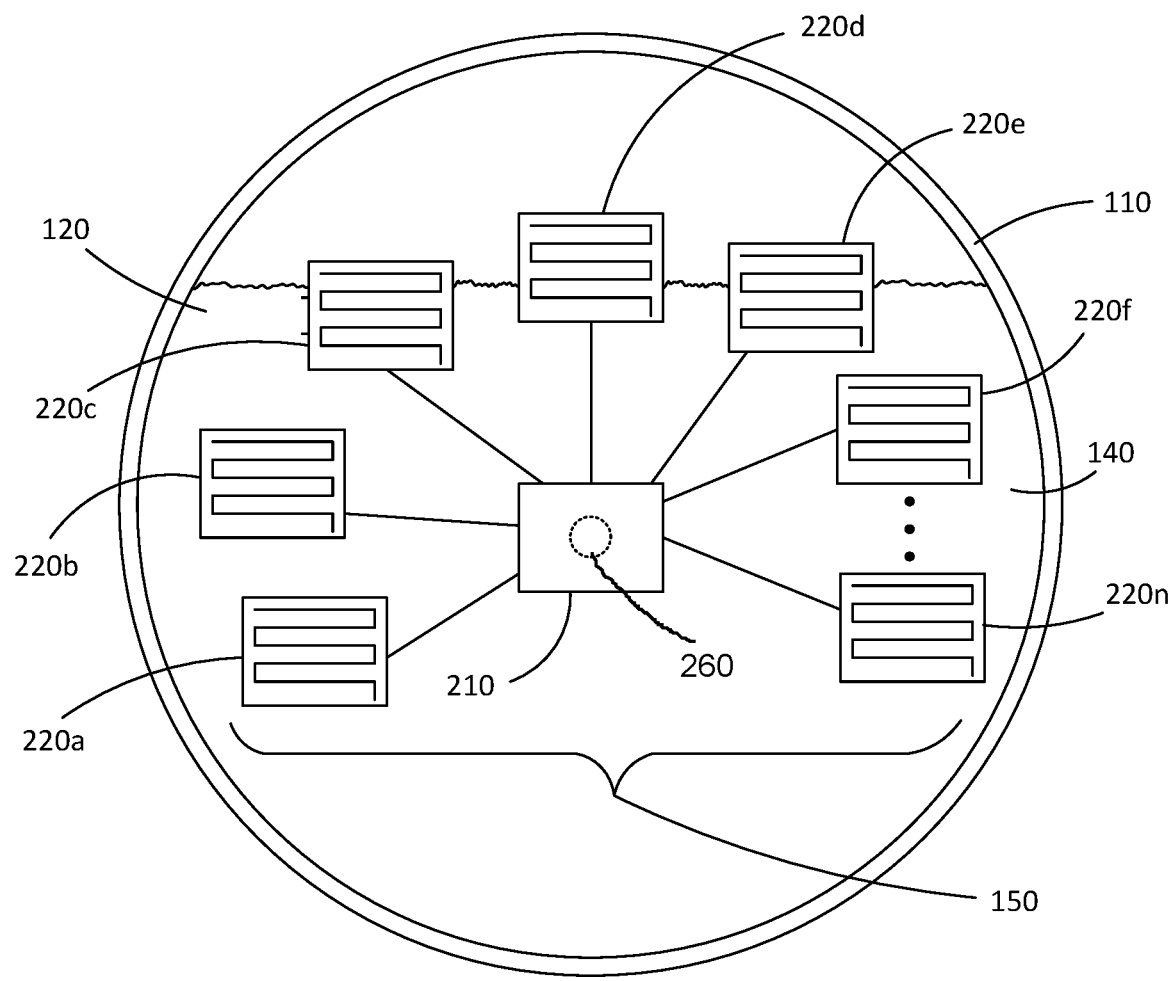
FIG. 2 illustrates a first exemplary embodiment of a system for determining liquid content within a barrel in accordance with the principles of the invention.

FIG. 2 illustrates a first exemplary embodiment of a monitoring system 150 in accordance with the principles of the invention.

In accordance with the principles of the invention, monitoring system 150 comprising processing section 210 and a plurality of antennas 220 (220a, 220b, 220c . . . 220n) which are positioned on a face surface 140 of a corresponding container or barrel 110.

In accordance with the illustrated aspect of the invention, monitoring system 150 is arranged circumferentially (a "wagon wheel" configuration) about the face surface 140 of barrel 110, wherein processing system 210 is at a center (or hub) of the plurality of illustrated antennas 220a, 220b, . . . 220n.

In accordance with this aspect of the invention, the position of each of the illustrated antennas 220a, 220b . . . 220n with respect to a center position 260 of face surface 140 is known and in a symmetrical relationship. For example, in this illustrated aspect, antennas 220a, 220b . . . 220n may be positioned on face 140 in a conventional "clock" formation. That is, antenna 220d is illustrated as being positioned in a 12 o'clock position with respect to center 260, antenna 220e is illustrated as being positioned at a 1 o'clock position with respect to center 260. Antenna 220f is illustrated as being positioned at a 2 o'clock position with respect to center 260 and antenna 220n may be positioned at a 4 o'clock position with respect to center 260. Similarly, antennas 220c, 220b and 220a may be positioned at 11 o'clock, 10 o'clock and 8 o'clock positions, respectively, with respect to center 260. In accordance with the principles of the invention, the positioning of the illustrated antennas establishes a relationship between a reference point (i.e., center point 260) and each of the antennas that may be used to determine a level of fluid 120 within container 110.

In another aspect of the invention, the plurality of illustrated antennas may be arranged in a physically, (i.e., non-systematical) relation, wherein antennas 220*d*, 220*e*, 220*f*, and 220*n* may be positioned as discussed above (12, 1, 2, 4 o'clock, respectively) and antennas 220*c*, 220*b* and 220*a* may be positioned at 11:30 o'clock, 10:30 o'clock and 8:30 o'clock positions, respectively with respect to center 260. In accordance with the principles of the invention, the positioning of the antennas 220*a* . . . 220*n* in this manner provides for a refined determination of the level of fluid 120 within container 110, as will be discussed.

In one aspect of the invention, processing system 210 provides signals to a corresponding one of the antenna 220*a*, . . . 220*n*, which operates as a transmitting antenna to transmit the signals through face 140 toward liquid 120 contained within barrel 110. The corresponding antenna 220*a* . . . 220*n*, may then operate as a receiving antenna to receive a reflection of the transmitted signal, which is caused by the interaction of the transmitted signal with the contained liquid 120.

In one aspect of the invention, antennas 220*a*, 220*b*, . . . 220*n* may be omni-direction antennas that emit (or transmit) signals over a wide field of view (e.g., toward and away from face 140). In another aspect of the invention, antennas 220*a*, 220*b* . . . 220*n* may be directional antennas that emit (or transmit) signals in a very limited field of view (e.g., toward face 140). In still another aspect of the invention antennas 220*a*, 220*b* . . . 220*n* may be highly directional antennas with narrow beams widths that emit (or transmit) signals in a limited and narrow field of view (e.g., toward face 140 with 1-degree beamwidth).

In one aspect of the invention, antennas 220*a*, 220*b* . . . 220*n* may each be configured as transmitting and receiving antenna, wherein original signals provided by processing system 210 are transmitted by antennas 220*a* . . . 220*n* and reflection signals, captured by antennas 220*a* . . . 220*n*), are provided to processing system 210. In another aspect of the invention, selected ones of the illustrated antennas 220*a*, 220*b* . . . 220*n* may operate as transmitting antennas to transmit signals into container 110 and selected other ones of the illustrated antennas 220*a*, 220*b* . . . 220*n* may operate as receiving antenna to capture reflections of the transmitted signals. The antennas designated as transmitting antennas receive signals from processing system 210 and receiving antenna provide signals to processing system 210.

In addition, antennas designated as transmitting antennas may comprise omni-directional or highly directional antenna and antennas designated as receiving antennas may be narrow beam width directional antennas.

In one aspect of the invention, a single antenna may be designated as a transmitting antenna (e.g., 220*d*) and the remaining of the illustrated antennas (220*a*, 220*b*, 220*c*, 220*e* . . . 220*n*) may be designated as receiving antenna. In this case, a single "ping" from the one transmitting antenna may be detected by a plurality of receiving antennas and the results of the detected reflections may be utilized to determine a level of fluid contained. In still another aspect of the invention, the single transmitting antenna may periodically transmit a "ping" and each of the designated receiving antenna may be selectively "turned-on" to enable the 'turned-on] receiving antenna to receive a reflection of the transmitted signal.

Although, monitoring system 150 is shown with processing system 210 as a central hub, it would be recognized by those skilled in the art that processing system 210 may be placed at any position on face 140 without altering the scope of the invention claimed.

Figure 3:
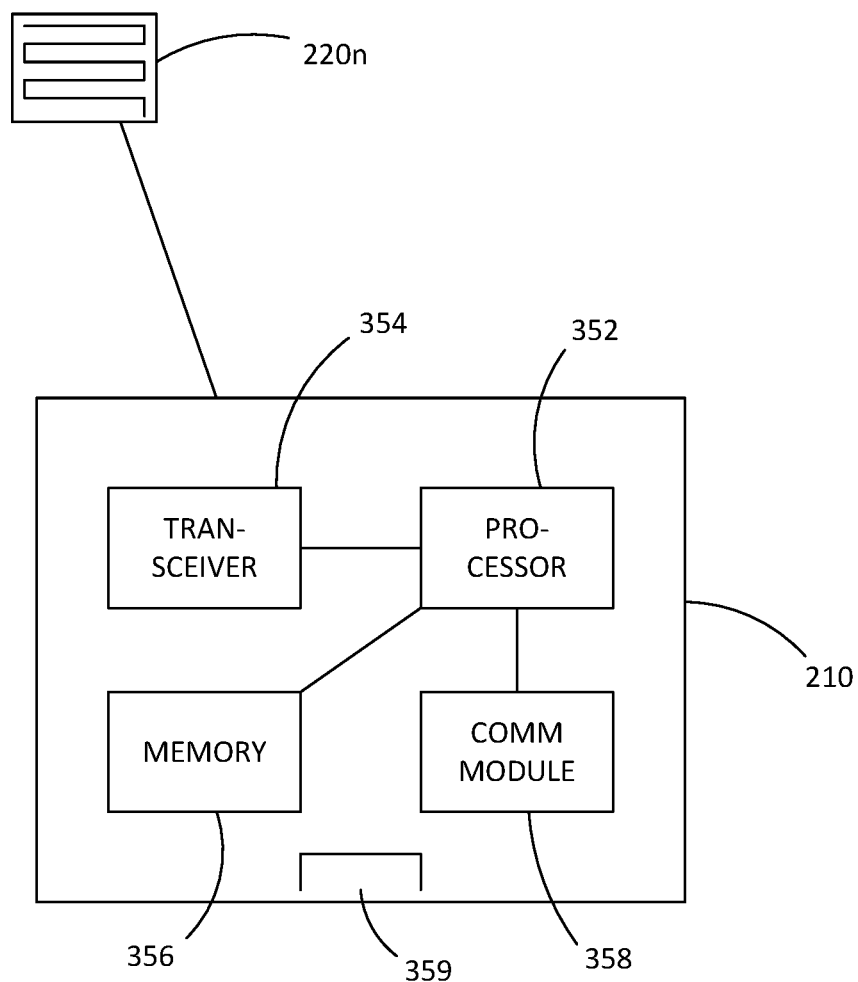
FIG. 3 illustrates a block diagram of an exemplary embodiment of a processing system for determining liquid content within a barrel in accordance with the principles of the invention.

FIG. 3 illustrates a block diagram of an exemplary embodiment of a processing system for determining liquid content within a barrel in accordance with the principles of the invention.

In accordance with the principles of the invention, processing system 210 comprises a transceiving (transmitter/receiver) system 354 that is in communication with antennas 220*a* . . . 220*n* (of which only antenna 220*n* is shown in FIG. 3). Transceiving system 354 may include one or more switching networks (not shown) that provide signals to selectively provide signals to a corresponding one of the plurality of antennas 220*a*, 220*b*, 220*c* . . . 220*n*. For example, transceiving system 354 may provide through a (not shown) switching network, signals to each of the plurality of antennas shown in FIG. 2, for example, in a sequential manner such that only one antenna is transmitting and/or receiving at any given time. Alternatively, the (not shown) switching network(s) may cause more than one antenna to concurrently transmit signals and/or receive reflection signals. Alternatively, the (not shown) switching network may cause at least one of the antennas to operate as a transmitting antenna while causing at least one of the plurality of antenna to operate as a receiving antenna.

Although element 354 is referred to as a transceiving system, it would be recognized that transceiving system 354 may comprise separate receiving and transmitting system without altering the scope of the invention claimed.

Processor 352 may comprise one or more conventional processing systems (e.g., INTEL Pentium serial processors) that operates to access instructions and provides control instruction to processing system 210. PENTIUM is a registered trademark of INTEL Corporation, a Delaware, USA corporation. Alternatively, processor 352 may comprise dedicated hardware and software that may provide control instruction to processing system 210.

Memory 356 provides storage capability for instructions (software, code) that may be accessed by processor 352 to control the processing of processing system 210. Memory 356 may for example be represented as semiconductor memory, such as a combination of PROM (programmable read-only memory), wherein instructions are permanently stored or RAM (random access memory), wherein data values may be accessed and overwritten.

Communication module (i.e., transmitter/receiver) 358 represents a means to provide data collected by processor 352 to one or more external devices (not shown), which may be used to evaluate, correlate and collate the data collected. Communication module 358 may comprise a wired or a wireless communication connection to the not shown external devices. For example, communication module 358 may be in wired communication with one or more systems that may be in communication with the Internet that allows for the monitoring of the determined fluid level over a broad geographical area.

Alternatively, communication module 358 may include elements that provide information through one or more wireless communication protocols (e.g., a very short-range NFC protocol (e.g., RFID), a short-range protocol (BLUETOOTH), a longer-range protocol (Wi-Fi) and a longrange protocol (e.g., cellular)). In addition, communication module 358 may operate to receive information from an external source either through a wired communication protocol or a wireless communication protocol. Such information may, for example, comprise instructions (code) that may be stored in memory 356, information regarding the tank (e.g., volume, dimensions, a type of material comprising the tank, etc.) to which system 150 is attached, and the content of the tank. This information may include information for the reprogramming, or the pairing, of system 150 with the specific tank (or barrel) 110. In one aspect of the invention, monitoring system 150 may be "paired" with a specific barrel, such that monitoring system 150 may monitor the contents of the paired barrel 110 over multiple uses of the barrel. For example, an identification number of the container (or barrel) to which monitoring system 150 is attached, may be inputted into memory 354. Alternatively, barrel 110 may include an electronic identification code that may be inputted via a wireless communication connection into monitoring system 150 (i.e., paired) using a short-range identification communication protocol (e.g., RFID).

Power source 359 provides power (electrical energy) to the electrical/electronic components of processing system 210. In one aspect of the invention power source 359 may represent a lithium-nickel battery that provides power to monitoring system 210 for an extended period of time. In another aspect of the invention, power source 359 may be a rechargeable battery element that may be recharged by removal from processing system 210 or recharged while included within processing system 210. Alternatively, power source 359 may be an AC to DC converter that receives electrical energy from a main source of power (e.g., 120-volt outlet) and converts the received power to a direct current that is used to power the electrical/electronic components of processing system 210.

Figure 4:
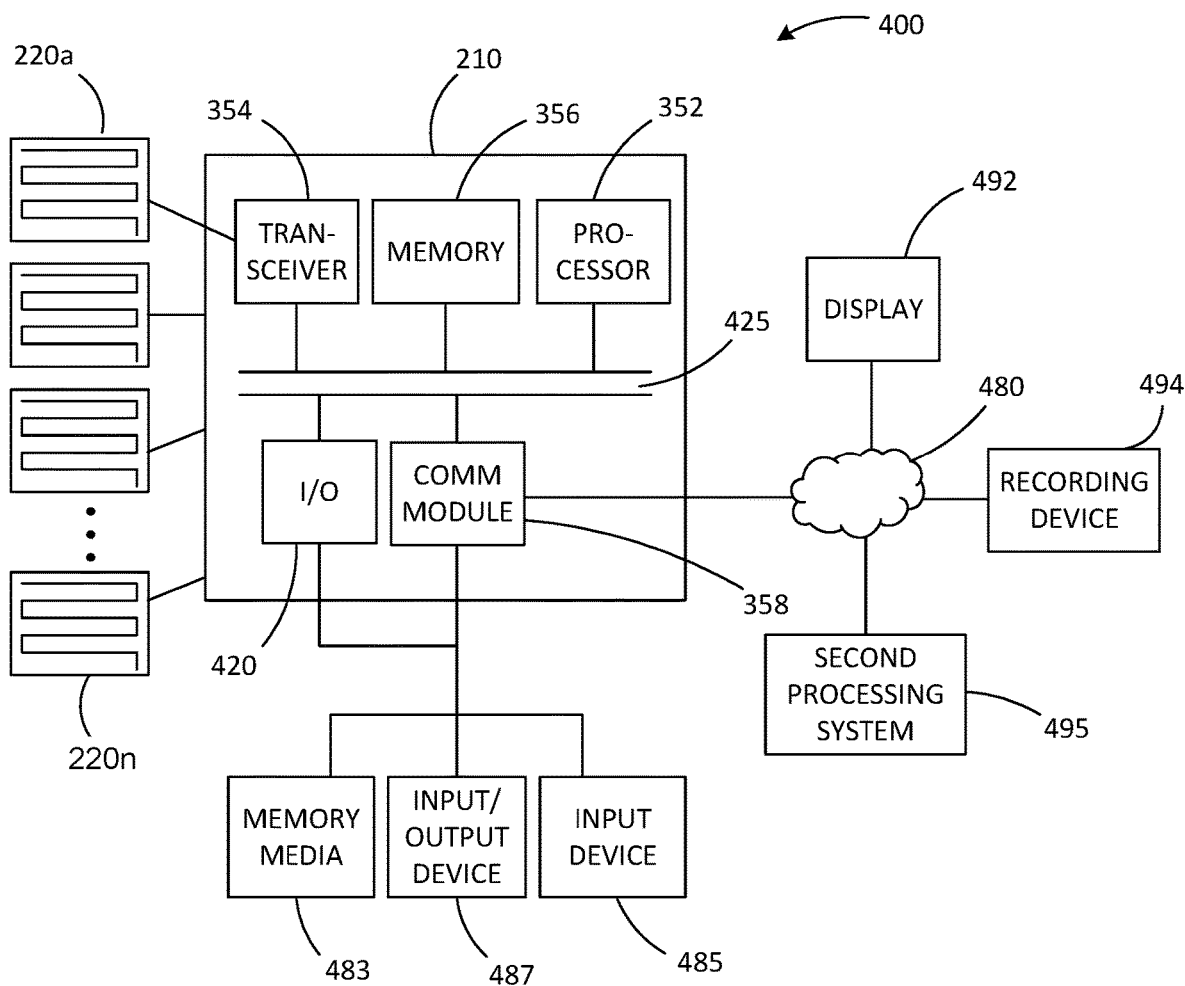
FIG. 4 illustrates a block diagram of an exemplary system for determining liquid content within a barrel in accordance with the principles of the invention.

FIG. 4 illustrates a block diagram of an exemplary system for determining liquid content within a barrel in accordance with the principles of the invention.

In this exemplary system embodiment 400, input data is received from antennas (sources) 220a . . . 220n and processed in accordance with one or more programs, either software or firmware, executed by processing system 210. The results of processing system 210 may then be transmitted over network 480 for viewing on display 492, reporting device 494 and/or a second processing system 495.

In the depicted implementation processing system 210 includes one or more receiving devices 354 that receive data from the illustrated sources or devices 220a . . . 220n. The received data is then applied to processor 352, which is in communication with input/output device 420 and memory 356. Transmitting/receiving element 354, processor 352 and memory 356 may communicate over a communication medium 425, which may represent a communication network, e.g., ISA, PCI, PCMCIA bus, one or more internal connections of a circuit, circuit card or other device, as well as portions and combinations of these and other communication media.

Processor 352 may be a general processor central processing unit (CPU) or a special purpose processing unit or dedicated hardware/software, such as a PAL, ASIC, FGPA, each of which is operable to execute computer instruction code or a combination of code and logical operations. In one embodiment, processor 352 may include, or access, software or code that, when executed by processor 352, performs the operations illustrated herein. As would be understood by those skilled in the art when a general-purpose computer (e.g., a CPU) loaded with or accesses software or code to implement the processing shown herein, the execution of the code transforms the general-purpose computer into a special purpose computer. The code may be contained in memory 356 or may be read or downloaded from one or more external devices.

For example, code or software may be downloaded from a memory medium, such as a solid-state memory or similar memory devices 483, or may be provided by a manual input device 485, such as a keyboard or a keypad entry, or may be read from a magnetic or optical medium (not shown) or via downloaded from a second I/O device 487 when needed. Information items provided by external devices 483, 485, 487 may be accessible to processor 352 through input/output device 420, as shown. Further, the data received by input/output device 420 may be immediately accessible by processor 352 or may be stored in memory 356. Processor 352 may further provide the results of the processing to one or more external devices (i.e., display 492, recording device 494 or a second processing unit 495).

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit (e.g., ASIC).

As would be understood, the operations illustrated may be performed sequentially or in parallel using different processors to determine specific values. Processing system 210 may also be in two-way communication with each of the sources 220a . . . 220n. Processing system 210 may further receive or transmit data over one or more network connections 480 from a server or servers over, e.g., a global computer communications network such as the Internet, Intranet, a wide area network (WAN), a metropolitan area network (MAN), a local area network (LAN), a terrestrial broadcast system, a cable network, a satellite network (cellular), and a wireless network (Wi-Fi), as well as portions or combinations of these and other types of networks. As will be appreciated, network 480 may also be internal networks or one or more internal connections of a circuit, circuit card or other device, as well as portions and combinations of these and other communication media or an external network, e.g., the Internet and Intranet.

In one aspect of the invention, external devices 483, 485, 487, 492, 494, 495 may be representative of a handheld calculator, a special purpose or general-purpose processing system, a desktop computer, a laptop computer, tablet computer, or personal digital assistant (PDA) device, etc., as well as portions or combinations of these and other devices that can perform the operations illustrated.

Figure 5A:
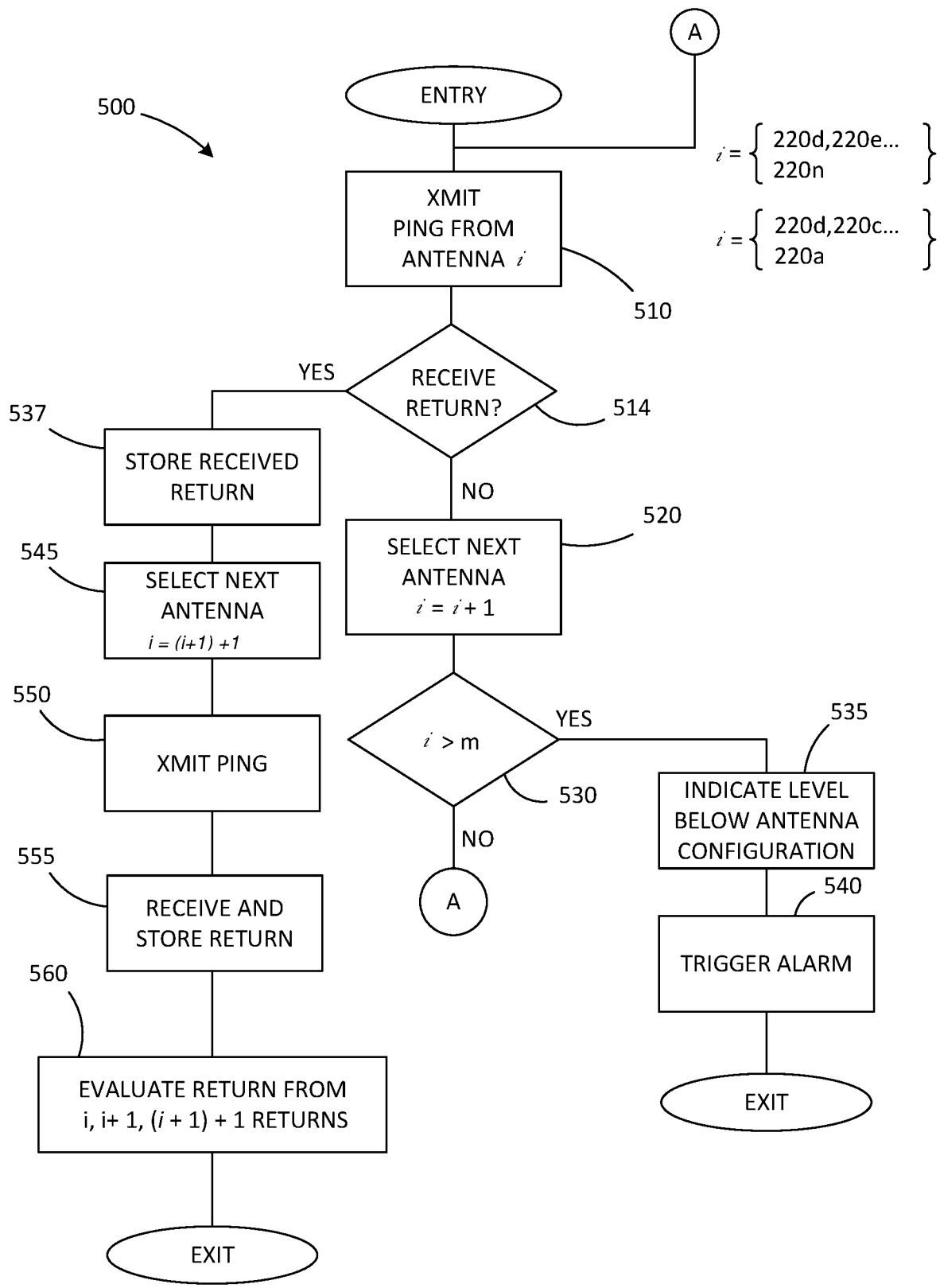
FIG. 5A illustrates a flowchart of an exemplary processing in accordance with the principles of the invention.

FIG. 5A illustrates a flowchart of an exemplary processing in accordance with the principles of the invention.

In this illustrated exemplary processing 500, the processing system 210 (described with reference to at least FIGS. 2-4) initiates transmission of a signal (referred to, hereinafter as "ping") to a selected one ("i") of the antenna 220a . . . 220n. In one aspect of the invention, the initially selected antenna may be selected as the top-most antenna (i.e., 220d, FIG. 2) as the container may be considered in an initially "full state."

In accordance with the illustrated embodiment shown in FIG. 2, processing may operate from the highest antenna 220d positioned on face 140 to the lowest antenna positioned on face 140 (220a or 220n). In one aspect of the invention, processing may select to operate with antennas selected from a first set of antennas (i.e., 220d, 220e . . . 220n—clockwise selection). Alternatively, processing may select to operate with antennas selected from a second set of antennas (i.e., 220d, 220c . . . 220a—counterclockwise selection). In still another alternative aspect of the invention, processing may select to operate using the first set of antennas and then the second set of antennas, wherein the first and second sets of antennas may be a symmetric or a non-symmetric relation with respect to a known point (e.g., center point 260).

Processing then selects, at step 510, an initial antenna selection, referred to as "i" from which a signal or a ping is to be transmitted. At step 514, processing waits for return or reflection of the transmitted ping.

Upon not receiving a return (or reflected) signal (after a known period of time, as discussed in FIG. 5B), processing continues to step 520, where a next ("i+1") antenna is selected from the selected clockwise or counterclockwise set of antennas. Processing then proceeds to step 530 where a check of the value (within the selected set) of the selected antenna is greater than the number of antenna (m) within the selected set of antenna. If the value of the selected antenna is greater than the number antenna within the set, then processing proceeds to step 535, wherein the returns (i.e., reflections of transmitted pings) from each of the antenna within the selected set of antenna is evaluated.

At step 535, the processing system 210 performs a test to determine if any return has been received from any antenna in the selected set. Upon determining no returns have been received from any of the antennas in the selected set, the processing system 210 sets an indication that no returns have been received from any of the antennas in the selected set and, hence, the liquid level is flagged as being "Too Low." At step 540, the processing system 210 triggers an alarm indication to indicate the "Too Low" condition.

Returning to step 530, if the value (within the selected set) of the next selected antenna is not greater than the number of antennas within the selected set, processing proceeds to step 510 to transmit (i.e., Xmit) a ping from the selected (next) antenna.

Returning to step 514, when a return is detected, processing proceeds to step 537 where the received return is stored. At step 545, a next antenna is selected ((i+1)+1), wherein processing proceeds to step 550 to transmit a ping from the selected (next) antenna. At step 555, a return from the transmitted "ping" is received and subsequently stored.

At step 560, the returns from the i, i+1 and (i+1)+1 antenna selected are evaluated to determine a level of the contained liquid.

As the antenna selection is made from highest to lowest antenna placement on face 140 (in this illustrative processing) after two sequential returns are received, processing is halted as each of the antennas lower in position to the (I+1)+1 antenna would be in contact with the contained liquid and, thus, information from these lower antennas do not contribute any additional information to the level of the contained liquid. This limitation of the number of antennas transmitting is advantageous as it reduces the power requirements needed in obtaining a level of the contained fluid.

Although FIG. 5A refers to processing for selecting one antenna in one of a clockwise set and a counterclockwise set of antennas, it would be understood that the processing shown in FIG. 5A may be adaptable to select first one set of antennas (e.g., clockwise) and then select the other set of antennas (e.g., counterclockwise) to determine the level of the contained liquid.

In one aspect of the invention, wherein the position of the antennas within one set (e.g., clockwise) of antenna on face 140 may be spatially offset from a position of the antenna in the second set (e.g., counterclockwise) of antenna on face 140 (i.e., non-symmetrical relation), the use of information from both the first and second sets of antenna provides for a more precise determination of the liquid within container 110.

Figure 5B:
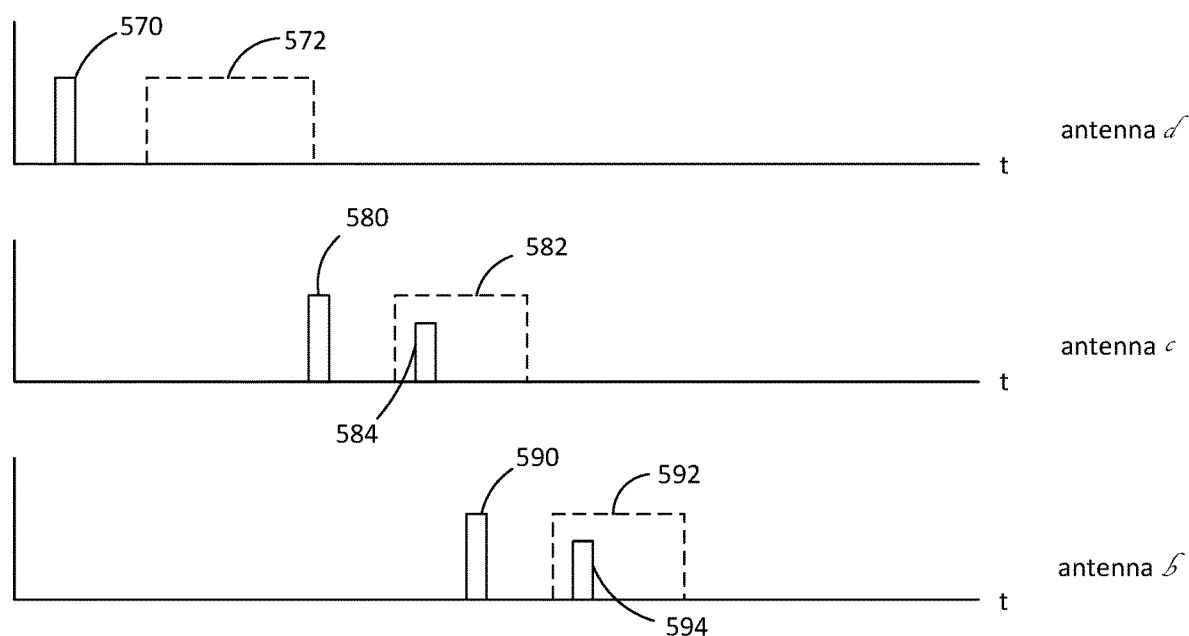
FIG. 5B illustrates an exemplary timing chart in accordance with the principles of the invention.

FIG. 5B illustrates an exemplary timing chart in accordance with the principles of the invention.

In this illustrated example, which corresponds to the processing shown in FIG. 5A, an initial ping or transmission 570 is made from antenna 220d (the highest antenna illustrated in FIG. 2). A return window 572 is opened. The time period the return window 572 remains open is based on the expected time of the detection of a return to ping 570.

In this illustrated example, a return is not detected within the expected time, which is flagged as a return, but a NO response. Processing proceeds to select a next antenna (e.g., antenna 220c), wherein a ping 580 is transmitted and a return window 582 is opened. In this illustrated example, return 584 is detected and window 582 is closed. A next antenna (e.g., antenna 220b) is selected from which ping 590 is transmitted and return window 592 is opened.

As illustrated, return 594 is detected and, thus, window 594 is closed.

Figure 6:
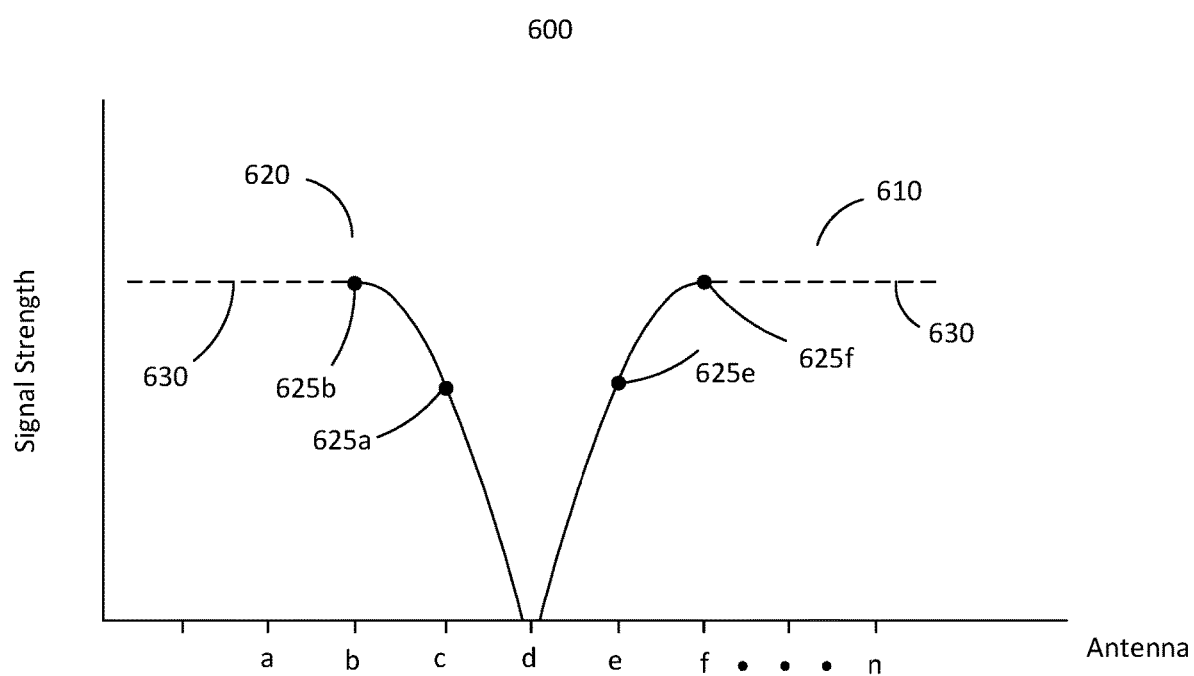
FIG. 6 illustrates a graph of an exemplary signal return chart for determined liquid content within a barrel in accordance with the principles of the invention.

FIG. 6 illustrates a graph of an exemplary signal return chart 600 for determining liquid content within a barrel in accordance with the principles of the invention.

In this illustrated example, which is related to the timing diagram shown in FIG. 5B, the transmission of a ping from antenna 220d produces no return and, hence, no signal is shown for antenna 220d in FIG. 6. However, with the selection of antenna 220e and 220f, returns 625e and 625f detected by antenna 220 and 220f, respectively are shown on graph segment 610.

With the detection of return 625e and, a second (confirmation) return 625f, processing may be halted and a level of contained liquid may be determined.

Further illustrated are returns 625c and 625b, associated with antenna 220c and 220b, (see FIG. 2), respectively on graph segment 620.

In accordance with one aspect of the invention, returns 625b, 625c, 625e and 625f may be evaluated (e.g., signal strength) to determine a level of the contained fluid.

In accordance with another aspect of the invention, the position of antennas 220b, 220c may be spatially offset (i.e., physically displaced) from antennas 220e, 220f and, thus, the evaluation of the received returns may determine the level of the contained liquid more precisely, as previously discussed.

Figure 7A:
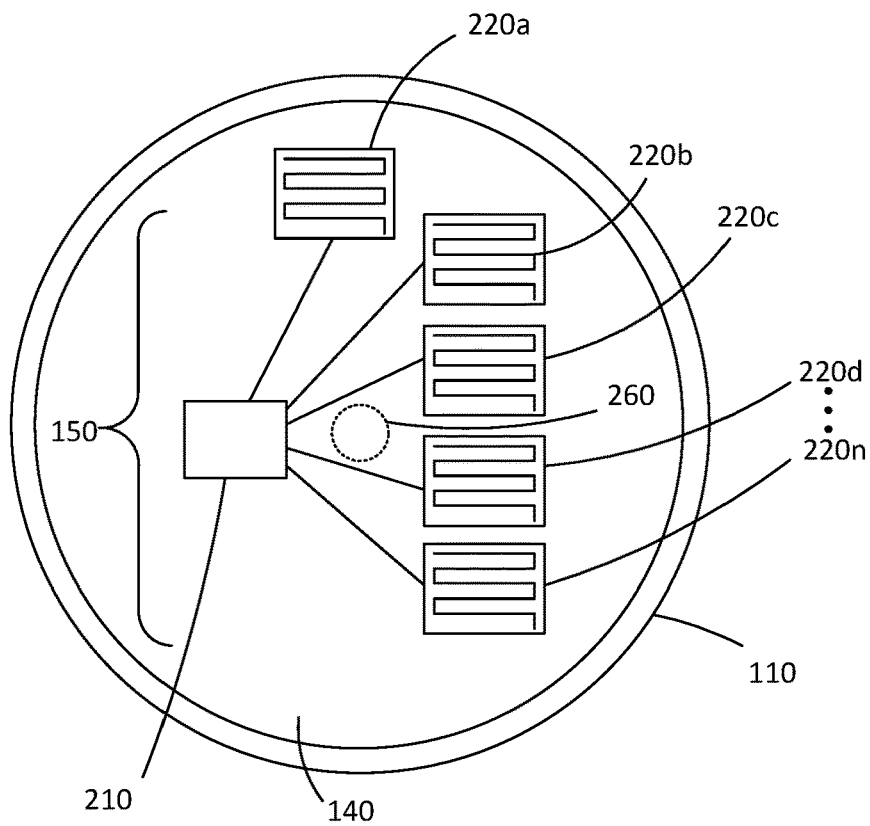
FIGS. 7A and 7B illustrate a first and second aspect of a second exemplary embodiment of a system for determining liquid content within a barrel in accordance with the principles of the invention.

FIG. 7A illustrates a first aspect of a second exemplary embodiment of a system for determining liquid content within a barrel in accordance with the principles of the invention.

In this illustrated configuration, antenna 220a, 220b . . . 220n are arranged linearly on face 140 of barrel 110.

In this illustrated configuration, antenna 220a, 220b, 220c, . . . 220n are shown in a linear arrangement, wherein processing similar to that shown in FIGS. 5A, 5B and 6 may be performed.

Figure 7B:
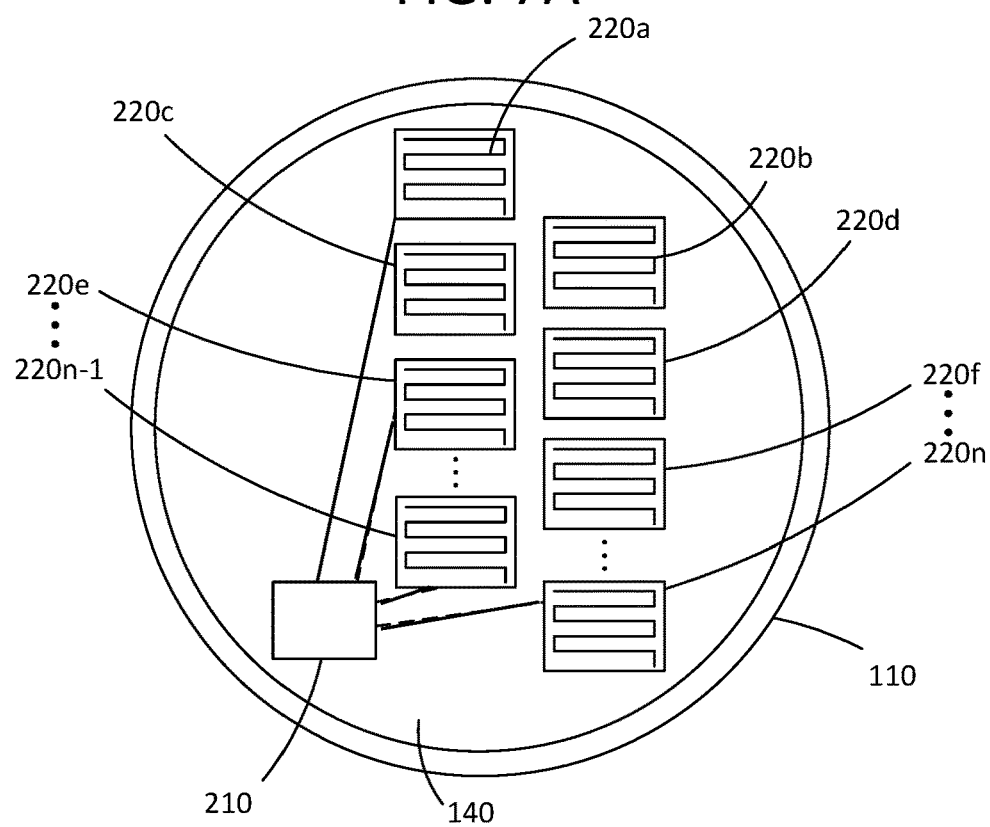

FIG. 7B illustrates a second aspect of a second exemplary embodiment of a system for determining liquid content within a container (or barrel) in accordance with the principles of the invention.

In this illustrated configuration, antenna 220a, 220c . . . 220n-1 may be arranged in a first set and antenna 220b, 220d . . . 220n may be arranged in a second set of antennas that is spatially offset from the first set of antennas. As discussed with regard to FIG. 2, the positioning of the illustrated plurality of antenna in a physically non-symmetrical relation allows for a more precise determination of a level of fluid within the barrel 110. In the implementation depicted by FIG. 7A the processing system 210 is disposed at a known offset distance from the center point 260 of the face 140 of the barrel 110. The implementation depicted by FIG. 7B includes but does not show the barrel 110 face 140 center point 260 that is not visible behind the depicted antenna 220e.

Accordingly, a determination of the level of a contained liquid may be made based on the receiving of reflections of transmitted pings or signals as previously discussed.

Figure 8:
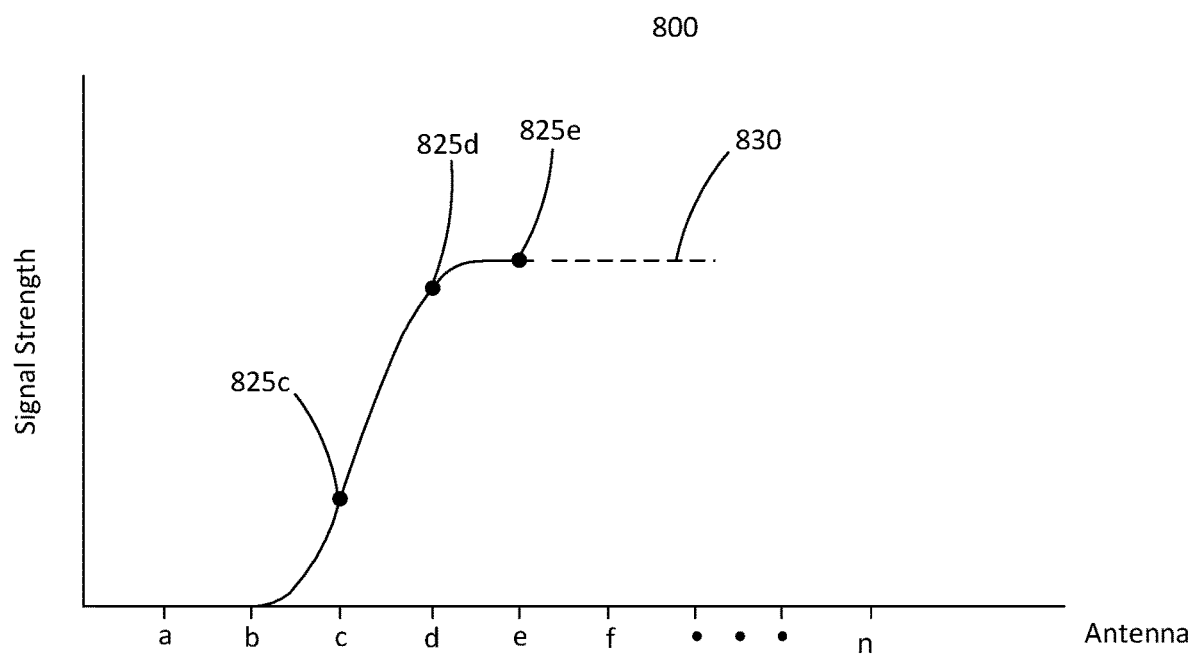
FIG. 8 illustrates a graph of an exemplary signal return chart associated with the configurations shown in FIGS. 7A and 7B for determined liquid content within a barrel in accordance with the principles of the invention.

FIG. 8 illustrates a graph of an exemplary signal return chart 800 associated with the configurations shown in FIGS. 7A and 7B in accordance with the principles of the invention.

In accordance with this aspect of the invention, signals transmitted by antenna 220a, 220b (two physically highest antenna, FIGS. 7A and 7B) fail to provide a response within an expected time window (FIG. 5B) and, thus, a first return 825c is received from the transmission of a ping from antenna 220c with a subsequent return 825d received from the transmission of a ping from antenna 220d as shown on graph segment 830. As discussed previously, processing may be halted after two consecutive returns are received.

In accordance with one aspect of the invention, when the returned signal level differ by a known amount, a next transmission and return 825e may be executed to validate a previous return (e.g., 825d).

In this illustrative example, a level of the content liquid in barrel 110 may be determined as lying between the position of antenna 220b and 220c, based on the strength of return signals depicted by FIG. 8. Hence, with the knowledge of the position of each of the antenna with respect to center point 260 (FIG. 2), the level of liquid 120, and the volume content within barrel 110 may be accurately determined.

Figure 9:
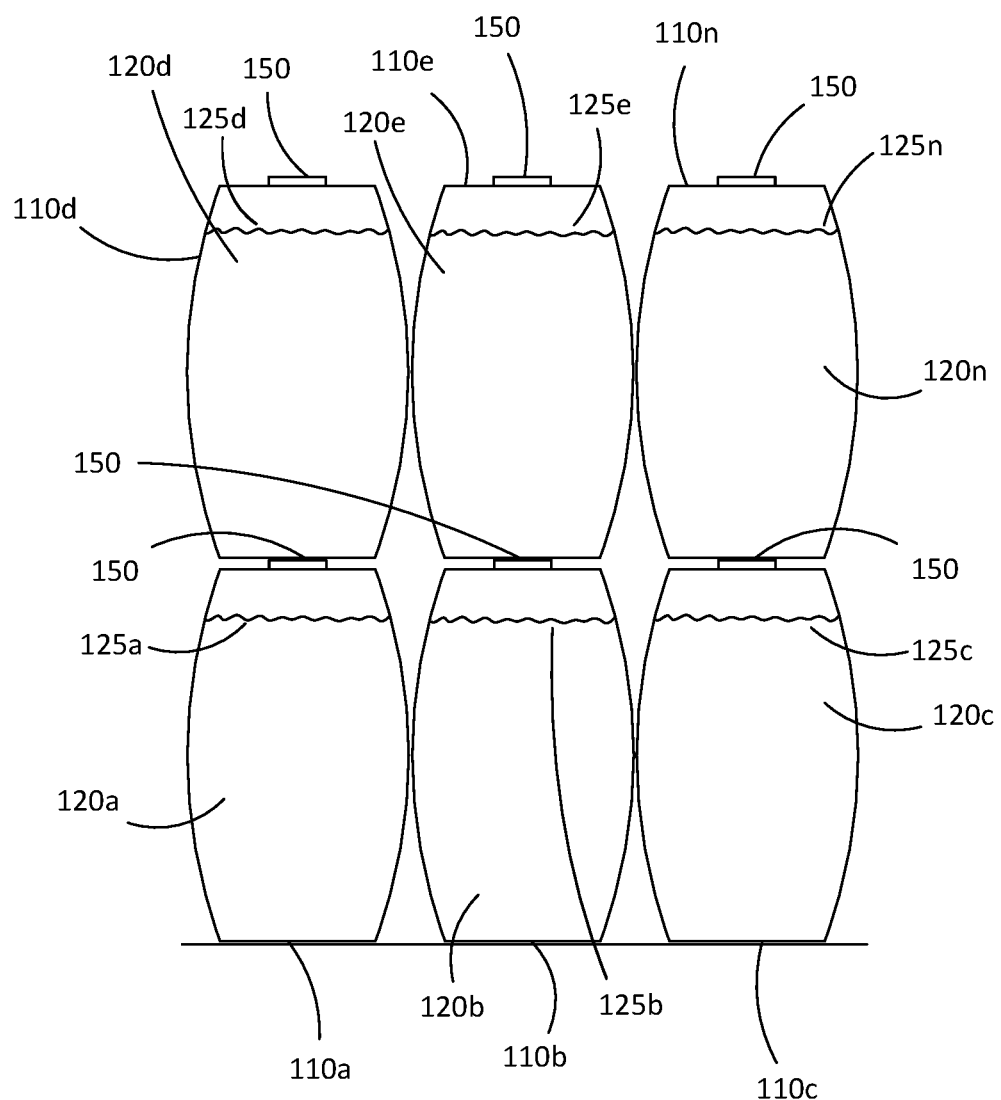
FIG. 9 illustrates a second conventional configuration for storing a plurality of barrels and the liquid contained therein.

FIG. 9 illustrates a second conventional configuration for storing a plurality of barrels and the liquid contained therein.

In this second configuration of storing barrels, barrels 110a, 110b, . . . 110n are stored vertically where monitoring system 150 is attached to face 140 of each of the illustrated barrels 110. The implementation depicted by FIG. 9 shows the exemplary respective liquid levels 125d, 125e, 125n, 125a, 125b, 125c of liquids 120d, 120e, 120n, 120a, 120b, 120c.

In this illustrated configuration, it would be recognized by those skilled in the art that the level of the contained liquid with each of the barrels may be obtained from a single signal or ping, as the level of the liquid is measured from face 140.

Accordingly, monitoring system 150 may be configured to include a single antenna configuration that may be used to monitor the vertically displaced liquid within the vertically stacked container(s) 110.

Figure 10:
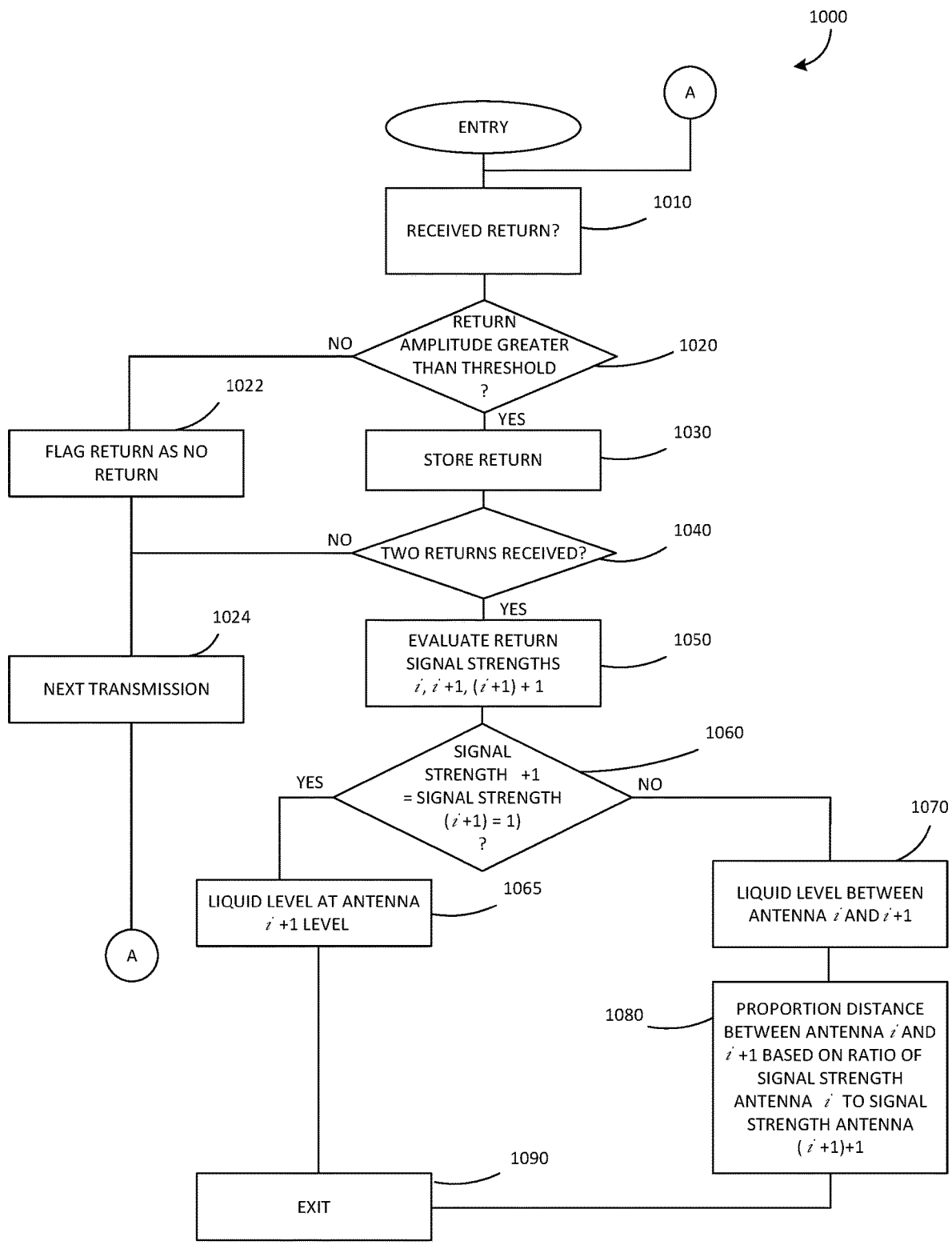
FIG. 10 illustrates a flowchart of an exemplary processing for determining liquid content within a barrel in accordance with the principles of the invention.

FIG. 10 illustrates a flowchart of an exemplary processing for evaluating the return signals in accordance with the principles of the invention.

In accordance with the illustrated processing 1000, a determination is made at step 1010 as to whether a return has been received. If so, a signal strength or amplitude of the received signal (i.e., the return) is evaluated with regard to a threshold level at step 1020. If the received signal strength is less than or equal to a predetermined minimum threshold level, then processing continues to step 1022, where the return is removed from the processing and an indication of NO return is associated with the transmitted ping. At step 1024, a next antenna is selected (as previously discussed) and processing continues at step 1010.

Returning to step 1020, if the return signal strength is greater than the predetermined minimum threshold, then processing proceeds to step 1030 where the return is stored.

At step 1040 a determination is made whether two consecutive returns have been received. If not, then processing proceeds to step 1024, wherein a next transmission is initiated.

However, if two consecutive returns have been received, the processing continues to step 1050 to evaluate the received signal strengths associated with the first return (i.e., antenna i+1) and the second return (i.e., antenna i+1+1).

At step 1060 a determination is made whether the received signal strengths of the two consecutive returns are approximately the same. If so then the contained liquid level is determined to be comparable to the position of the i+1 antenna at step 1065. Processing then proceeds to step 1090 where the processing is ended.

Returning to step 1060, if the signal strengths are not approximately equal, then the liquid level may be determined to be between the $i^{th}$ and the $i^{th}+1$ antenna at step 1070. In one aspect of the invention, the liquid level may be determined proportionally between the $i^{th}$ and the $i^{th}+1$ antenna based on the signal strength of the $i^{th}+1$ antenna with respect to the signal strength of the $i^{th}+1+1$ antenna.

Processing then proceeds to step 1090 to exit.

In accordance with the principles of the invention, the determined level of the contained liquid, based on the signal strength of at least two responses or reflections, which are greater than a threshold value may then be transmitted to one or more of the illustrated external devices shown in FIG. 4. In one aspect of the invention, threshold value may be preset within memory 356. Alternatively, a threshold value may be downloaded into memory 356 in a manner as previously discussed. In still another aspect of the invention, the threshold value may be dynamically determined, based in part, on the characteristics of the container. For example, a size of the container, a material of the container, etc. For example, a calibration of the monitoring system 150 may occur once placed on a face 140 of a container, wherein the characteristics of the container and/or contained liquid may be entered into monitoring system 150. A series of transmissions may occur from one or more of antenna 220a . . . 220n, and the responses to the series of transmissions may be evaluated for establishing a threshold value that enables signals that may be considered valid responses to the processed.

In one aspect of the invention, a volume of the contained liquid may be obtained from at least the determined fluid level and knowledge of the physical dimensions of the container. For example, the volume of the barrel or tank may be determined as:

$$V(\text{tank}) = \pi r^2 L$$

where L is the length of the tank; and r is the radius of a circular segment of the tank.

The filled volume of a horizontally oriented tank or barrel, for example, may be determined by first finding an area, A, of a circular segment and multiplying it by the length, L.

A partial volume calculation may next be derived as:

$$A=(½)r2(\Theta-\sin\Theta)$$

where $\Theta=2*\arccos(m/r)$ and
$\Theta$ is in radians.

Accordingly, a volume of a segment may be determined as:

$$V(\text{segment})=(½)r^2(\Theta-\sin\Theta)L.$$

If the determined fluid level, f, is less than ½ of "d", then the segment created from the level height and V(fill)=V (segment).

However, if the fluid level, f, is greater than ½ of "d" then, the segment that is created by the empty portion of the tank may be determined and subtracted from the total volume of the container or tank to obtain:

$$V(\text{fill})=V(\text{tank})-V(\text{segment}).$$

In another aspect of the invention, for vertically oriented barrels, the volume of the contained liquid may be obtained as:

$$V(\text{tank})=\pi r^2 h,$$

where h is height of the contained fluid.

FIGS. 11A-11C illustrate exemplary signal transmission and signal return graphs as a function of time in accordance with a further aspect of the invention.

In accordance with this further aspect of the invention, the quality of a container may be determined by the long-term evaluation of the losses (leakage and/or absorption) of the liquids contained with the container. The long-term evaluation of the losses associated with a container may further be utilized to determine a rate of testing of the liquid within the container.

FIG. 11A illustrates an exemplary signal transmission graph 1100 as a function of time, wherein signal transmissions occur within bursts over an extended period of time. In accordance with the principles of the invention, the duration of the usage of monitoring system 150 is divided into a plurality of periods 1106, 1107, 1108, 1109, 111, 1113 and 1117, which are referred to in this exemplary illustration as collection time periods. Further shown are a plurality of transmission bursts 1105, 1110, 1115 . . . 1150, wherein a measurement of a fluid within a container is made.

FIG. 11B is an expanded view of burst 1105, which is identified as FIG. 11B in FIG. 11A.

In this illustrated example, a plurality of transmissions 570, 580 and 590 (which are comparable to the transmissions shown in FIG. 5B) are included within burst 1105, wherein the plurality of transmissions are associated with at least one of the illustrated antenna 220a-220n, as previously discussed. Accordingly, a collection of fluid levels may be obtained for each of the illustrated transmission bursts.

In one aspect of the invention, processing system 210 may include a timer circuit (not shown) that provides an alarm clock feature that causes processing system 210 to transmit burst 1105, containing transmissions 570, 580, 590. After processing the associated reflections from transmissions 570, 580, 590, processing system 210 may enter a sleep mode, in which little power is consumed. After burst 1105 is completed, processing system 210 may again be activated by the timer circuit (not shown) to cause the transmission of signals (i.e., 570, 580, 590) within burst 1110.

This process of sleeping after each burst is completed and activating after a known time thereafter (e.g., 1112, 1114, 1119, 1124 . . . 1149) repeats for the life of the container or barrel to which monitoring system 150 is attached.

This process of sleeping and activation is advantageous as it provides for extended usable life of a fixed, or dedicated power source.

In one aspect of the invention, the activation time may be substantially constant such that fluid measurement may be made at a known rate. For example, burst transmissions 1105 . . . 1150 may occur at a known rate (e.g., a daily basis, a weekly basis, a monthly basis, etc.). The desired rate of fluid measurement may be inputted into processing system 210 as previously described.

Alternatively, and as shown in FIG. 11A, the rate of fluid measurement may be made dynamically, based on changes in the fluid measurement over time.

FIG. 11C illustrates an exemplary graph 1140 of corresponding fluid levels or container volume determined based on the return signals associated with the transmission bursts.

In this exemplary graph, a fluid level or container volume value 1155 may be determined based on the signal transmissions/signal returns associated with burst 1105. Similarly, a fluid level or container volume value 1160 may be determined based on the signal transmissions/signal returns associated with burst 1110. And in accordance with the principles of the invention, fluid levels or container volumes 1165, 110, 1175, 1180 1185, 1195, etc. may be determined based on the signal transmissions/signal returns associated with corresponding transmission bursts 1115, 1120, 1125, 1130, 1135, 1150, etc.

As illustrated, the determined fluid level, or volume, initially decreases from a high value 1155 (i.e., full barrel) to a lower value 1175 and then remains substantially constant (i.e., 1175, 1180, 1185) as the losses from leakage and/or absorption decrease over time.

Accordingly, the rate of change of the fluid level or volume may, thus, be used to determine a duration of a sleep state of processing system 210. For example, when the rate of change of the fluid level is high (e.g., level 1155 to level 1160), signal transmission bursts and subsequent level measurements may be performed at a first rate (e.g., once/day). However, as the rate of change of the measured fluid level is slowing (e.g., level 1165 to level 1170) the duration of a sleep state of processing system 210 may be increased such that signal transmission bursts and measurements are performed at a second rate (e.g., once/week). In addition, as the rate of change of the measured fluid level is determined to be substantially negligible (e.g., level 1180 to level 1185) the duration of the sleep state of processing system 210 may be increased still further.

This dynamic determination of the rate of measurement is further advantageous as it further decreases the power needed to maintain system 150 for extended periods (e.g., multiple years).

Figure 12:
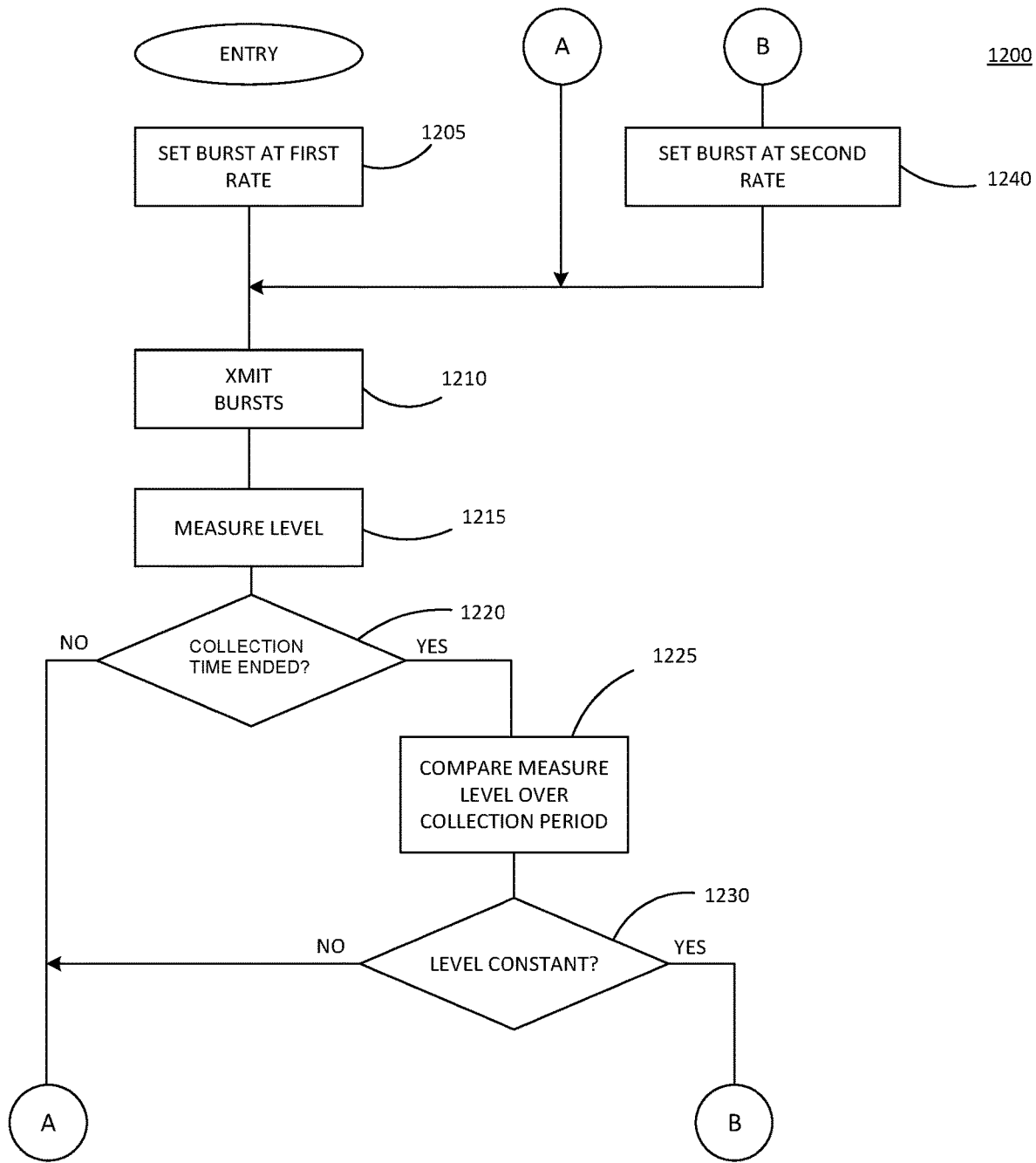
FIG. 12 illustrates an exemplary processing associated with the graphs shown in FIGS. 11A and 11B.

FIG. 12 illustrates an exemplary processing 1200 associated with the graphs shown in FIGS. 11A-11C.

In this illustrated process, the rate of burst transmission 1105-1150 (each containing signal transmission 570, 580 590) is set to a first rate at step 1205. At step 1210, a burst transmission (e.g., 1105) occurs wherein a fluid level (or volume) is determined at step 1215, as previously discussed. At step 1220, a determination is made whether a collection time has ended. If not, then processing proceeds to step 1210 to cause the emission of a second or next burst transmission (e.g., 1110), wherein a second measurement level is determined. At step 1220, a determination is again made as to whether a collection time has ended (e.g., 1106).

If the collection time has ended, processing proceeds to step 1225, wherein the determined fluid level (volume) (e.g., 1155, 1160) are evaluated to determine a rate of change of the determined fluid levels.

At step 1230, a determination is made whether the rate of change is small (i.e., substantially constant level). If the rate of change is not small (i.e., fluid level is not substantially constant) then processing proceeds to step 1210, wherein a next set of burst transmission (e.g., 1115, 1120) occur at the first rate.

However, if the rate of change of the fluid level is small (i.e., fluid level is determined to be substantially constant), then processing proceeds to step 1240, wherein the rate of subsequent transmission bursts is set to a second rate. As shown in FIG. 11A, the second rate is increased such that processing system 210 remains in a sleep state for a longer period and a lesser number of burst transmissions 1130, 1135 occur in an associated collection time period.

In summary, the presented invention, which may be attached to a face of a container, such as a barrel or a tank, comprises at least one antenna and an electronic system that causes the transmission of one or more signals in at least one frequency range, where the transmitted signals that are reflected off the fluid or liquid contained within the container are captured and evaluated to determine a level of the fluid or liquid within the tank. The system disclosed achieves technical advantages over the prior art as the invention disclosed remains external to the enclosed system (barrel, etc.) and does not affect the internal ecosystem or contents of the barrel.

In addition, a method associated with the present invention is disclosed, wherein the method comprises the steps of: transmitting at least one signal into said tank; receiving a response associated with selected ones of said transmitted at least one signal; and evaluating said received response associated with selected ones of said transmitted at least one signal, wherein said evaluation comprises: determining a signal strength of each of said received response; selecting at least two of said received responses, wherein said selected responses are associated with a highest signal strength; and determining said fluid level based on a relationship between said selected at least two of said received responses.

Although various features have been described with reference to the Figures, other features are possible. For example, a device implementation in accordance with the present disclosure may comprise modular units with a varying thickness print flex antenna across a barrel face. The device may be implemented with a custom-designed PCB motherboard configured to be mounted in the middle of the barrel face. The device may comprise radar and radio frequency chips and a separate data transceiver module. The data transceiver module may be configured to operate using BLUETOOTH, LORAWAN or another band protocol. The device may be configured with a defined power source, for example a C1, D2 certified single core battery. The device may be attached to the face of an enclosed system (e.g., a whiskey barrel) with the printed antenna arrays located with reference to a defined position of a watch/barrel face. The antenna arrays may be located with reference to the center point of the watch/barrel face. The devices may be adhered or attached to the barrel face with an adhesive or attached with composite fasteners (screw/nail/staples, or the like).

The device may be configured to use a combination of Millimeter Wave (MM Wave) and or Radio Wave (RF), and/or other direct analog measurement methodologies to determine the liquid substrate level behind a barrel face. Liquid-level measurements may be relayed to multiple central communications hubs via BLUETOOTH, LORAWAN or any other communications technology, depending on the distance from the barrel to central device. From the central device, measurement data may be exported out of the rickhouse via satellite, cellular, or fiber connection to the cloud or a handheld device. A device implementation deployed on a barrel may be configured to broadcast measurement data packets from the barrel to the central device and from there exported out of the rickhouse via satellite, cellular, or fiber connection to the cloud or a handheld device configured to collect the measurement data packets exported from the central receiving device.

The device implementation may be configured to account for the introduction of foreign bodies or materials such as wooden staves, woods chips, or anything else that would displace the liquid level. For example, software may be configured to account for the displacement measurement and the displacement differential of any object inserted into the liquid to maintain an accurate measurement. In an illustrative example, the displacement and/or differential measurement software implementation may have a foreign body displacement measurement mode that determines displacement differential between liquid levels measured at different points in time, that is, before and after a foreign body is introduced to the container. The device implementation may incorporate the use of RFID to connect the device to software to track the device/barrel location in a rickhouse.

The device implementation may use MM Wave, RF Wave, or another lower frequency or band as needed. This radar may be a low enough frequency (e.g. <10 GHz) to ensure penetration of the wood. The signal that is transmitted into the barrel by the antenna would be reflected back at levels where the liquid is present, in contrast with no reflections from levels where the liquid is not present. This group of reflections and non-reflections produces a total measured signal that is processed by the device to determine an estimate of the height of the liquid-air interface.

In an illustrative example a device implementation may be configured to determine liquid level measurements in a horizontal rick storage mode. For example, a horizontal rick storage mode implementation may be configured to measure the liquid level over time as it relates to where any substrate is in contact with the barrel face as well as the liquid-air interface. Such an implementation will be able to determine fluid volume at any given period. Distillers are required by law to log exactly how many proof gallons they put into any barrel at any time. The device implementation may be calibrated by inputting the exact amount of whiskey/tequila/spirits/etc. (substrate) reported to all required international governmental agencies on to the device, permitting the device to measure the differential of evaporation over time (AKA "The Angels Share"). In an illustrative example, the device implementation can then determine loss over time based on how antennas read the liquid-air interface behind each antenna. In this example implementation, the device is directly measuring the difference in liquid level between points of a varying printed antenna design as well as any liquid-air gaps in the antenna array which may vary in size and orientation.

In another illustrative example a device implementation may be configured to determine liquid level measurements in a vertical palletized storage mode. For example, a vertical palletized storage mode implementation may be configured to measure the reflection between the waves as it pertains to liquid content of an aging barrel. In this mode one or more antennas will reflect waves downward through the barrel face and measure the reflection time between device and barrel, device and substrate, device and barrel bottom as well as any materials inserted or placed in the barrel. This measurement may calculate the distance and relative length of the wave and convert that measure into an accurate measure of substrate. Some waves will go through the barrel and never return and will be disregarded. The device may be configured to only interpret what the device knows as operative space and measure total volume.

The device implementation may be a combination of a peel and stick design and/or with a potential non-metal/composite screw/staple/nail or fastening device that would allow distillers to adhere/attach the device to the barrel face at the time of barrel fill.

During barrel fill distillers are required by the law to exactly track and log the amount of liquid put in the barrel as stated above. All barrels may not be filled to the same fill level or amount. Accordingly, one or more calibration steps may be performed, as described herein. Connecting the device to the barrel and the system may benefit from calibration to ensure correct and accurate measurements. In an illustrative example a software application may be configured to uniquely associate the barrel to the device for the barrel's primary lifespan (these could be sent to a secondary market). For example, a unique hardware identifier for a barrel may be associated in a database with a unique identifier for an instance of the measurement device disclosed herein. In such an example, particular calibration data determined for the barrel/measurement device pair may be uniquely associated with the measurement device in the database, permitting the calibration and measurement performance of the device to be tracked over time.

As these rickhouse environments are quite harsh, a very strong adhesive or other fastening device may be used to adhere/attach the device to the barrel face in both horizontal (traditional rick storage) and vertical (palletized) storage options. We may also encase the designed PCB board and all of the components in a strong epoxy resin potting material or other hard casing to protect all electronics from any potential damage. Damage could be from forces like bumps, scrapes, dings to whiskey leaking on top and heat and/or humidity.

Once the barrel is filled and calibrated; the device is capable of providing a near absolute liquid level measurement. Barrels may range in total volume (the industry average is a 53-gallon barrel which will vary in finished size.) Barrels can be filled above 53 gallons. In an illustrative example the device may adhere/attach to the barrel face in the same fashion regardless of barrel size or storage options such as horizontal rick storage and palletized storage. Antenna arrays can vary in size and orientation based on the size of the barrel face as the barrels vary in total surface volume.

After fill, barrels may be moved to their storage locations where they will sit for varying periods of time. Because of this the device design may comprise a single core ATEX certified battery system which will give a potential life span between 6-10 years. In an illustrative example the device may be configured to satisfy a fire safety class 1 div 2 classifications according to DISCUS, NEC, and as well as ATEX class 2. Keeping fire safety in mind, the single core battery may be used because the single core battery traditionally has a slower discharge rate than reusable or rechargeable batteries. The device may be configured to ping only once a month, every month for the life span of the device or barrel, to conserve battery energy.

The device may be configured to be in communication with a central receiver. The central receiver may be configured in communication with other sensors such as ambient temperature and humidity. Once the device is pinged from the central receiver, the device will activate; once activated the device programming will cause the device to follow distinct operation sequences for horizontal storage and palletized storage device implementations.

In an illustrative example a device implementation designed for a horizontal storage mode in a traditional rickhouse may be configured to perform operations comprising: the device will activate an RF signal which goes across the antenna array; the device will measure exactly the differential of what is behind the barrel head and any relation to the space liquid-air differential between antennas across the clock face of the barrel and the device; as well as the relation of what's behind the wood to our antenna array will allow for volume measurement.

In an illustrative example a device implementation designed for a palletized storage mode may be configured to perform operations comprising: the device will activate in a similar manner as the horizontal storage mode implementation but rather with an MM signal. The device will fire downward and register the wavelength and reflection between device, barrel face, liquid, barrel bottom, and any particulate inside the barrel; the device will then interpret the total space of liquid contained and a measurement will be calculated.

All measurements will be saved in platform for the distiller or end user to make both qualitative and quantitative inferences. These qualitative and quantitative inferences may be used to calculate predictions for Barrel Yield, Tax Planning, Barrel Provenance, and Supply Chain planning.

If a distiller can understand exactly where their total run volume stands more accurately than current industry models of 2-4% loss per year they can make better decisions and inferences on metrics such as barrel performance as it relates to the quality of a cooperage (barrel maker), how any potential variable may affect a barrel such as heat, humidity, any coating material or R&D experiment. Knowing the volume of barrel can allow distillers to make many decisions to both increase efficiency and reduce industrial waste.

Another value add is that with the accurate volume, distillers can work with their insurance provider to reduce potential premiums as well as make sure that they are neither under-insured or over-insured. They would just be adequately insured for loss.

Potential Yield: In the pursuit of optimizing production, distilleries need to and want to accurately gauge the volume of whiskey in each barrel. This not only helps in maximizing the yield from each batch but also in efficiently utilizing resources. Precise measurements allow for better supply chain forecasting and planning, ensuring that each step of the distillation and aging process is conducted with the utmost efficiency. Also helping with yield as it pertains to number of bottles and cases for their distributors.

Tax Planning: The taxation on distilled spirits can be complex, and it's based, in part, on the volume of product produced and stored. Accurate barrel measurements are essential for distilleries to comply with tax regulations accurately. This precision helps avoid over or underpayment of taxes, which can have significant financial implications. By knowing exactly how much whiskey is in each barrel, distilleries can file more accurate tax returns, thus avoiding potential legal and financial issues. There are major benefits to know your PGs (proof gallons) as tax rates do change from around $2.85 and $13.25 once a distillery crossed a set limit (100,000 PGs or roughly 1886 barrel) taxes increase.

Provenance: from its distillation to its aging—knowing volume and history adds to the product's allure and value consumers will pay. Precise barrel measurement contributes to the detailed tracking of each batch's journey, ensuring that the provenance is well-documented and authentic. This level of detail enriches the narrative of the whiskey, providing whiskey enthusiasts with a deeper appreciation of its heritage and quality.

The device may be implemented with a flex tail antenna array that will cover the clockface or in a wagon wheel design of a whiskey barrel that is adhered by a durable adhesive or composite fastener. RF and MM wave chips may be used to determine the liquid levels. The device may include a fire safety approved battery. The device may be configured with multiple interfaces to push data both into and out of the device. The device may be encased in a hard epoxy potting or protective casing. The device may be configured with BLUETOOTH, LORAWAN or another communication band to carry data in and out of the device.

The device remains external to the barrel and does not impede the aging process. The device lowers labor cost over handheld devices and is more accurate. The device is also on the face of the barrel; thus, the barrel can be rolled without the device having to be removed.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above regarding specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A system for determining a fluid level contained within a tank, said system comprising:
   at least one transmission antenna positioned on an external face of said tank, said at least one transmission antenna configured to:
   transmit a signal into said tank; and
   at least one receiving antenna positioned on said external face of said tank, said at least one receiving antenna configured to:
   receive a reflection of said transmitted signal; and
   a processing system configured to:
   provide said signal to each of said at least one transmission antenna;
   receive said reflection associated with each of said transmissions associated with said at least one transmission antenna;
   evaluate said received reflections associated with each of said transmissions, said evaluation comprising:
   determining a signal strength of said received reflections;
   associating an antenna position with each of said received reflections; and
   establishing said fluid level contained within said container based on said signal strength of selected ones of said at least one receiving antenna and a position associated with said selected ones of said at least one receiving antenna.

2. The system of claim 1, wherein said position of said at least one transmission antenna and said at least one receiving antenna is known with respect to a reference point on said face of said container.

3. The system of claim 1, wherein said at least one transmission antenna is arranged circumferentially about said face of said container.

4. The system of claim 1, wherein said at least one receiving antenna is arranged about said face of said container.

5. The system of claim 1, wherein said at least one transmission antenna and said at least one receiving antenna are directional antennas.

6. The system of claim 1, wherein said at least one transmission antenna is said at least one receiving antenna.

7. The system of claim 1, wherein said at least one transmission antenna is spatially offset from said at least one receiving antenna.

8. The system of claim 7, wherein said received reflections are removed from said evaluation when a reflection amplitude is below a known threshold.

9. The system of claim 1, comprising:
   a communication module configured to:
   transmit information from said system to at least one first external system; and
   receive information from at least one second external system.

10. The system of claim 1, wherein said processing system is configured to:
    provide said signal to each of said at least one transmission antenna sequentially.

11. The system of claim 1, wherein said transmitted signal is within at least one of: a millimeter wavelength band, a UHF wavelength band and a VHF wavelength band.

12. A system for determining a fluid level within a container, said system comprising:
    a plurality of antennas spatially arranged at a known location with respect to a reference point about an external face of said container, said plurality of antennas configured to:
    transmit signal and receive reflections of said signal within at least one known wavelength band; and
    a processing system comprising:
    a transceiver configured to:
    transmit said signals and receive said reflections of said signals;
    a memory configured to:
    retain software instruction; and
    a processing unit configured to:
    access said software instruction from said memory, wherein said software instruction causes said processing system to perform the steps of:
    receive said reflections of said signals,
    determine a signal strength associated with each of said reflections;
    relate said signal strength to a corresponding one of said plurality of antenna; and
    determine said level of said fluid based on said signal strength and a location of said corresponding one of said plurality of antenna.

13. The system of claim 12, wherein said plurality of antennas are arranged circumferentially about said face of said container.

14. The system of claim 13, wherein said plurality of antennas are systemically arranged with regard to said reference point.

15. The system of claim 13, wherein said plurality of antennas are non-systemically arranged with regard to said reference point.

16. The system of claim 12, wherein said plurality of antennas are arranged linearly about said face of said container.

17. The system of claim 13, wherein selected ones of said plurality of antennas are arranged in a first set of antennas and selected other ones of said plurality of antennas are arranged in a second set of antennas.

18. The system of claim 17, wherein said plurality of antennas in said first set are in a non-symmetrical relation to said plurality of antennas in said second set.

19. A method of determining a fluid level within a container, said method comprises the steps of:

transmitting at least one signal into said container; and receiving a response associated with selected ones of said transmitted at least one signal; and evaluating said received response associated with selected ones of said transmitted at least one signal, wherein said evaluation comprises the steps of:

determining a signal strength of each of said received response;

selecting at least two of said received responses, wherein said selected responses are associated with a highest signal strength; and determining said fluid level based on a relationship between said selected at least two of said received responses and positions of associated antennas with respect to a reference point on said container.

\* \* \* \* \*